United States Patent
Brereton et al.

(10) Patent No.: US 7,017,249 B2
(45) Date of Patent: Mar. 28, 2006

(54) APPARATUS AND METHOD FOR FORMING A TUBE HAVING AN ARTICLE ATTACHED THERETO

(75) Inventors: Neil Brereton, Aurora (CA); Murray R. Mason, Bolton (CA)

(73) Assignee: F & P Mfg., Inc., Tottenham (CA)

( * ) Notice: Subject to any disclaimer, the term of this patent is extended or adjusted under 35 U.S.C. 154(b) by 671 days.

(21) Appl. No.: 10/279,724

(22) Filed: Oct. 25, 2002

(65) Prior Publication Data

US 2003/0051327 A1 Mar. 20, 2003

Related U.S. Application Data

(62) Division of application No. 09/739,346, filed on Dec. 19, 2000, now Pat. No. 6,505,389.

(51) Int. Cl.
*B23P 17/00* (2006.01)

(52) U.S. Cl. .................. 29/421.1; 29/523; 72/61

(58) Field of Classification Search ........... 29/421.1, 29/525.14, 33 D, 33 T, 897.2, 523, 897.312, 29/890.044; 72/61, 58, 62, 370.23; 228/173.1, 228/164, 193, 194, 234.1, 235.1
See application file for complete search history.

(56) References Cited

U.S. PATENT DOCUMENTS

| | | | | |
|---|---|---|---|---|
| 4,293,995 A | * | 10/1981 | Jordan | 29/421.1 |
| 4,759,111 A | * | 7/1988 | Cudini | 29/523 |
| 4,882,825 A | * | 11/1989 | Nakamura | 29/888.1 |
| 5,431,326 A | * | 7/1995 | Ni et al. | 228/155 |
| 5,644,829 A | * | 7/1997 | Mason et al. | 29/421.1 |
| 5,720,092 A | * | 2/1998 | Ni et al. | 29/421.1 |
| 5,839,777 A | * | 11/1998 | Vlahovic | 296/205 |
| 5,845,382 A | * | 12/1998 | Schultz et al. | 29/421.1 |
| 5,862,877 A | * | 1/1999 | Horton et al. | 180/312 |
| 5,879,099 A | * | 3/1999 | Thoms | 403/297 |
| 6,065,211 A | * | 5/2000 | Birkert | 29/897.2 |
| 6,070,445 A | * | 6/2000 | Holierhoek | 72/61 |
| 6,092,287 A | * | 7/2000 | Thoms | 29/897.2 |
| 6,098,437 A | * | 8/2000 | Kocer et al. | 72/55 |
| 6,122,812 A | * | 9/2000 | Thoms | 29/283.5 |
| 6,122,948 A | * | 9/2000 | Moses | 72/61 |
| 6,276,740 B1 | * | 8/2001 | Mellor et al. | 296/72 |

* cited by examiner

*Primary Examiner*—Teri P. Luu
*Assistant Examiner*—T. Nguyen
(74) *Attorney, Agent, or Firm*—Bereskin & Parr

(57) ABSTRACT

In the present invention, at least one tubular blank and at least one article such as a metal stamping, to be attached to a hydroformed part, are loaded into a die. The tube is hydroformed using typical methods. The article is positioned in the die such that, when the tube is hydroformed, the final hydroformed tube contacts the article at least at a point. Attachment means, such as a laser welder, are provided with access to the contact point between the article and the hydroformed tube so that a tack weld or other attachment can be made between the article and the hydroformed tube while still in the closed die. The hydroformed tube and attached article are then removed as a joint assembly from the die.

10 Claims, 3 Drawing Sheets

APPARATUS AND METHOD FOR FORMING A TUBE HAVING AN ARTICLE ATTACHED THERETO

RELATED APPLICATION

This application is a divisional of application Ser. No. 09/739,346, filed on Dec. 19, 2000.

FIELD OF THE INVENTION

This invention relates to hydroforming a tube and, more particularly, to forming a tube with an article attached thereto.

BACKGROUND OF THE INVENTION

Hydroforming is well known for its ability to form an integral hollow beam with a complex shape, something which would otherwise have to be fabricated from several pieces and/or bent to shape. Typically, a round tubular blank is inserted between a pair of dies which have an internal cavity in the form of the desired exterior shape of the final part. Then the ends of the tube are plugged and the interior chamber of the tubular blank is pressurized, generally with water or hydraulic fluid, to force it into the shape of the die cavity. The completed part is then de-pressurized and removed.

The hydroformed part often, in its final application, requires that one or more articles be attached to it. For example, hydroformed components are used in making subframe assemblies in automobiles, such as shown in FIG. 1. The subframe assembly A often have metal stampings S and cross-member C welded thereto to form the subframe assembly and permit the subframe assembly to be fastened to a frame assembly. To accomplish this, typically once the tube T has been hydroformed, it is removed from the die and placed in a welding jig, along with metal stampings S, so that a welding machine can weld stampings S to tube T to yield hydroformed assembly A. However, these additional fitting and welding steps add process cost and time, and also have a tendency to introduce errors such as additional dimensional variation or missed process steps, both of which can be detrimental to the function and economics of the part.

Referring to U.S. Pat. No. 5,845,382 to Schultz et al., it is known in the manufacturing of a seat frame assembly to position a hollow cylindrical part in a die and circumferentially around a tube to be hydroformed prior to hydroforming, and then hydroforming the tube to expand it outwardly to integrally engage the outer cylindrical to effectively lock the pieces together. While this technique does limit the requirement for additional assembly and welding steps, its application is limited to situations where the article to be circumferentially attached surrounds the hydroformed part.

Accordingly, there is a need for an improved method and apparatus for attaching an article to a hydroformed tube which can decrease process costs and time, as well as increase the accuracy and repeatability with which mass produced parts are fabricated.

SUMMARY OF THE INVENTION

In one aspect, the present invention provides an apparatus for hydroforming at least one tubular blank comprising a closeable die having at least one cavity therein for confining at least one tubular blank, the die being adapted to receive at least one article and position the at least one article substantially in contact with the at least one tubular blank at at least one contact point, and pressurizing means for internally pressurizing the at least one tubular blank to a desired pressure, the closeable die being adapted to permit access to the at least one contact point while the die is in a closed condition so that the at least one article may be attached to the at least one tubular blank when the die is closed.

In a second aspect, the present invention provides an apparatus for hydroforming at least one tubular blank comprising a die having at least one cavity therein for confining at least one tubular blank, the die adapted to receive at least one article for attachment to the at least one tubular blank, pressurizing means for internally pressurizing the at least one tubular member to a desired pressure, and attachment means for attaching the at least one article to the at least one tubular blank, wherein the die and the attachment means are adapted to permit the at least one article to be attached to the at least one tubular blank when the at least one blank is disposed in the at least one cavity.

In a third aspect, the present invention provides a method for hydroforming at least one tubular member comprising the steps of placing at least one tubular blank in at least one cavity defined in a die, the at least one cavity having an internal surface corresponding to a desired configuration of a final tubular member, the at least one tubular blank having an internal chamber and a wall, placing at least one article in the die, confining the at least one tubular blank and the at least one article in the die, sealing the internal chamber, pressurizing the internal chamber so as to cause the at least one blank to conform to the internal surface of the at least one cavity to create the at least one tubular member, contacting the at least one article with the wall of the at least one tubular member, and attaching the at least one article to the wall of the at least one tubular member.

BRIEF DESCRIPTION OF THE DRAWINGS

For a better understanding of the present invention, and to show more clearly how it may be carried into effect, reference will now be made by way of example to the accompanying drawings.

The drawings show articles made according to a preferred embodiment of the present invention, in which.

DETAILED DESCRIPTION OF THE INVENTION

Figure 2:
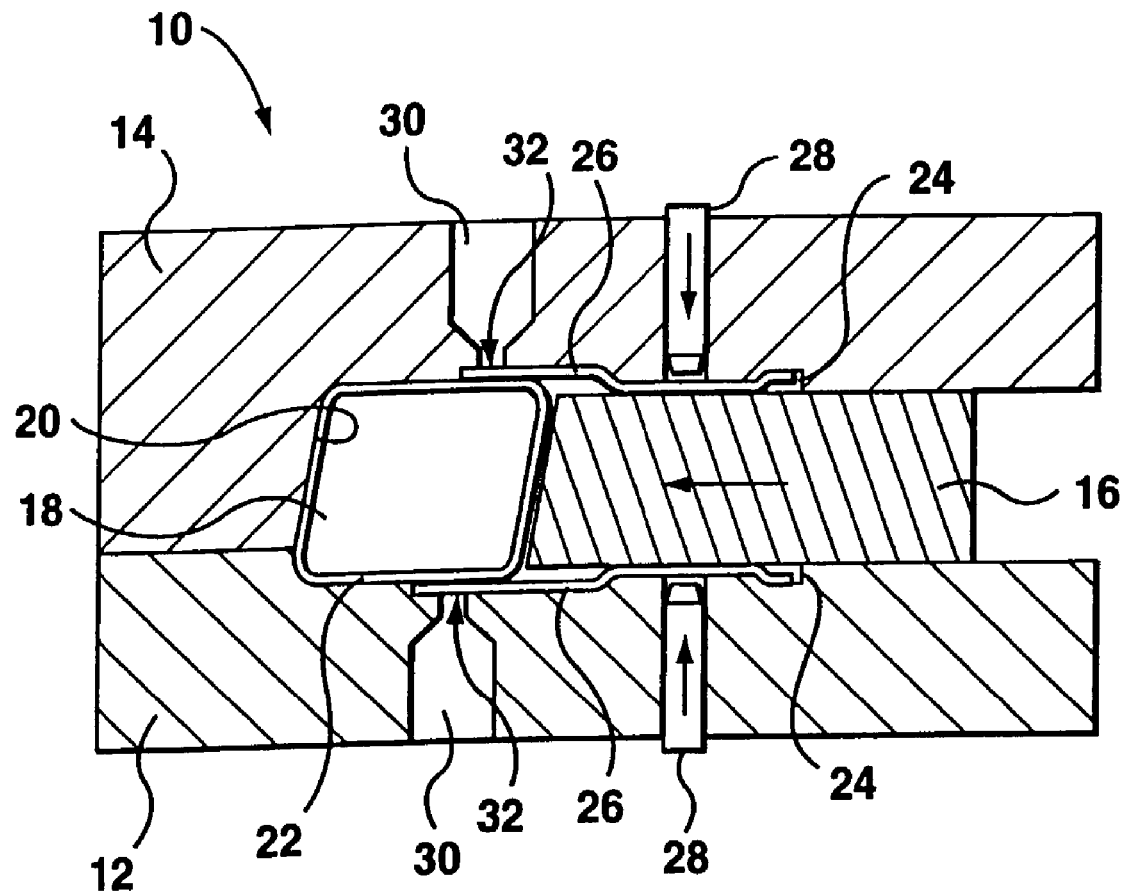
FIG. 2 is a sectional side view of a hydroforming die set according to the present invention.

Hydroforming presses and dies are well known in the art and thus it is necessary only to describe such equipment briefly here. Referring to FIG. 2, a hydroforming apparatus according to the present invention is shown generally at 10. Apparatus 10 has a first die half 12 a second die half 14 and a slide 16 which cooperate to form an interior cavity 18 having an internal surface 20. The shape of internal surface 20 is one which is desired as the final shape for a tubular blank (not shown), having an internal chamber (not shown), to be formed in cavity 18 to yield tubular member 22, as will described in more detail below. A pair of recesses 24 are provided in die halves 12 and 14, each for receiving a pair of articles 26 for attachment to tubular member 22 according to the present invention. A pair of locating pins 28 are provided in die halves 12 and 14 for positioning and holding articles 26 in position, as described below. Die halves 12 and 14 each have a passageway 30 which provides access to an attachment point 32 between each article 26 and tubular member 22.

In use, a tubular blank (not shown) is positioned in cavity 18 in die half 12 and articles 26 are placed in recesses 24. Locating pins 28 are positioned to hold articles 26 in position against slide 16. Die halves 12 and 14 are closed and the tubular blank (not shown) is pressurized to cause tubular member 22 to be formed against internal surface 20 of cavity 18 and against articles 26. The closing pressure of die halves 12 and 14 may also form articles 26, as desired, and the shape of tubular member 22 may conform locally around articles 26, thereby permitting tubular member 22 to receive articles 26 so as to provide a close fit between them.

After hydroforming, a laser weld is provided through passages 30 to tack weld articles 26 to tubular member 22. The internal pressure in tubular member 22 is released and die halves 12 and 14 are opened to yield the assembled part which may then be further processed (if required) to strengthen the connection between articles 26 and tubular member 22.

Figure 1:
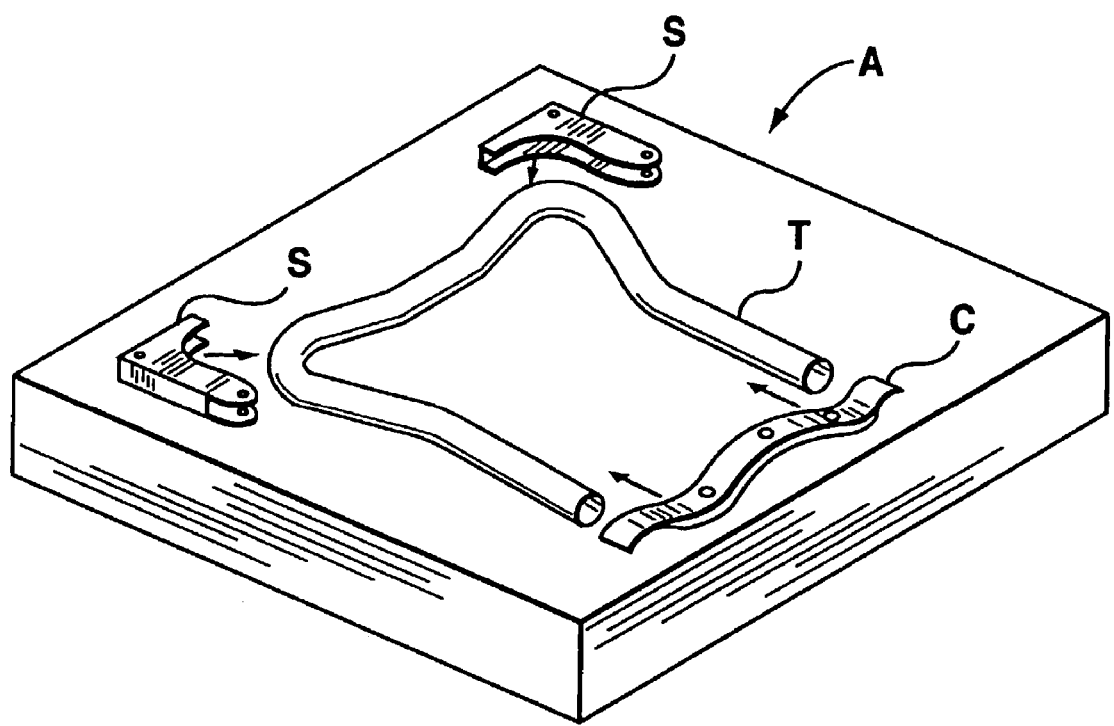
FIG. 1 is an exploded isometric view of an automobile subframe assembly.

Referring again to FIG. 1, present invention permits articles such as bracket stampings "S" to be assembled onto a hydroformed tubular member "T" more or less simultaneously with the hydroforming process. Advantageously, this reduces the number of steps required in fabricating parts having hydroformed components and increases the repeatability and dimensional accuracy of the final part.

While the above description constitutes the preferred embodiment, it will be appreciated that the present invention is susceptible to modification and change without departing from the fair meaning of the accompanying claims.

Figure 3:
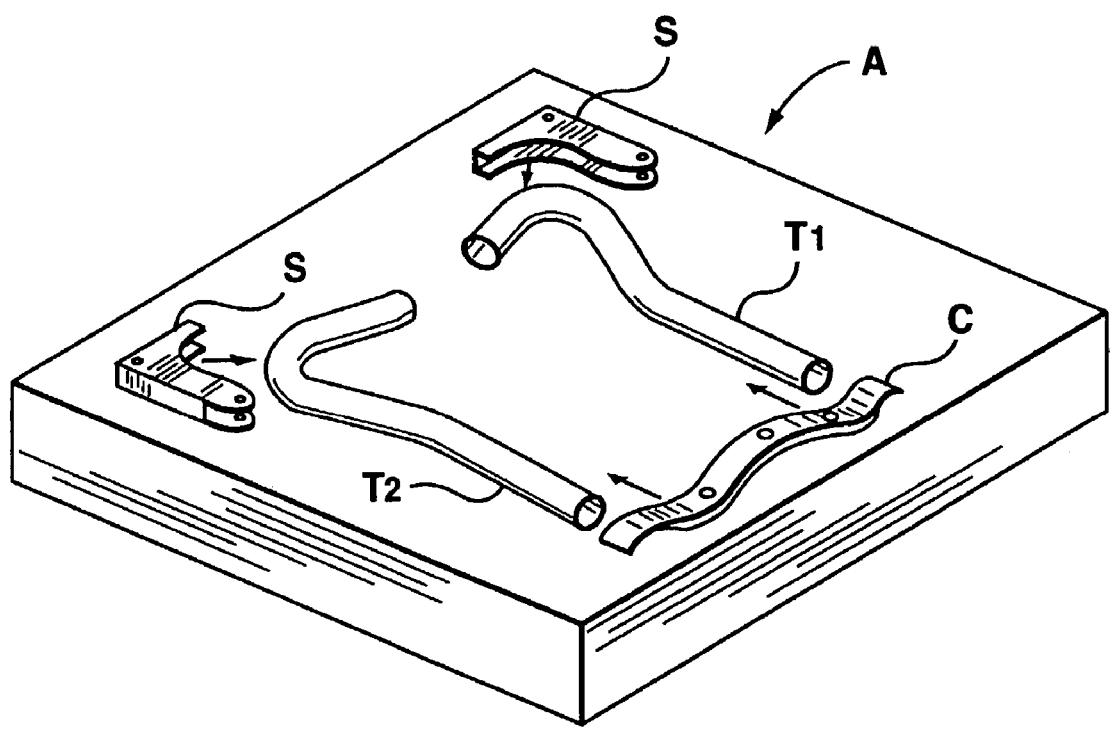
FIG. 3 is an exploded isometric view of another automobile subframe assembly.

For example, referring to FIG. 3, one skilled in the art will understand that more than one part, such has tubes T1 and T2, may be hydroformed in apparatus 10. Also, one skilled in the art will understand that articles 26 need not be flat articles or a stamping, but may have any shape and formed by any process and made from any desirable material.

Also, the means by which the articles are attached to the tubular member in the die is not critical to the present invention, and laser welding need not necessarily be used. Other types of welding, or an adhesive, or other temporary or permanent fastening means may be employed, such as chemical bonding agents like glue, other mechanical means such as riveting, brazing or soldering. Still other fastening means may be employed.

Further, attachment need not be done while the dies are closed, but may be done after the dies are opened. Attachment may be done while hydroforming pressure is maintained in tubular member 22, or the pressure may be varied or may be released altogether.

The present invention may be employed with any known hydroforming technique and may be used with low-pressure hydroforming and with high-pressure hydroforming techniques. It will be understood that the particular means of hydroforming tubular member 22 is not important to the present invention and, further, that the tubular member need not be formed at all in the cavity, but rather its initial shape may be maintained. Non-cylindrical blank may also be used.

Still other modifications may be apparent to those skilled in the art but these are not intended to depart from the scope of the appended claims. It will be understood in the claims that the step of pressurizing the internal chamber of the blank may be performed either before or after the step of confining the blank in the die cavity.

The invention claimed is:

1. An apparatus for hydroforming at least one tubular blank comprising:
   (a) a closeable die having at least one cavity therein for confining at least one tubular blank, said die being shaped to receive at least one article and position said at least one article substantially in contact with said at least one tubular blank at least one contact point; and
   (b) pressurizing means for internally pressurizing said at least one tubular blank to a desired pressure;
   (c) said closeable die having at least one passageway shaped and sized to permit access to said at least one contact point while said die is in a closed condition; and
   (d) attachment means for attaching said at least one article to said at least one tubular blank at said at least one contact point without substantially deforming said at least one article, when said die is closed.

2. The apparatus of claim 1, wherein said attachment means comprising a welding apparatus for welding said at least one article to said at least one tubular blank.

3. The apparatus of claim 1, wherein said closeable die further comprises at least one recess for receiving and positioning said at least one article in said die.

4. The apparatus of claim 3, wherein said closeable die comprises a first die half, a second die half, and a sliding member, the sliding member cooperating with said first die half and second die half to form said cavity and said recess.

5. An apparatus for hydroforming at least one tubular blank comprising:
   (a) a die having at least one cavity therein for confining at least one tubular blank, said die having a recess for receiving and positioning at least one article for attachment to said at least one tubular blank;
   (b) wherein said die comprises a first die half, a second die half, and a sliding member, said sliding member cooperating with said first die half and said second half to form said cavity and said at least one recess; and
   (c) pressurizing means for internally pressurizing said at least one tubular member to a desired pressure;
   (d) wherein said die has at least one passageway shaped and sized to permit access to said cavity and said recess and to allow said at least one article to be attached to said at least one tubular blank while said blank and said article are confined in said cavity.

6. The apparatus of claim 5, further comprising a pair of moving pins mounted within said die halves, wherein said pins are capable of being pressed against said at least one article so as to hold said at least one article against said sliding member.

7. The apparatus of claim 4, further comprising a pair of moving pins mounted within said die halves, wherein said pins are capable of being pressed against said at least one article so as to hold said at least one article against said sliding member.

8. The apparatus of claim 5, further comprising attachment means for attaching said at least one article to said at least one tubular blank.

9. The apparatus of claim 1 wherein said attachment means is selected from the group comprising a welding apparatus, a soldering apparatus, a brazing apparatus, a riveting apparatus and an adhesive-applying apparatus.

10. The apparatus of claim 8, wherein the attachment means comprises a welding apparatus.

* * * * *